(12) United States Patent
Yamasaki et al.

(10) Patent No.: US 8,493,824 B2
(45) Date of Patent: Jul. 23, 2013

(54) OPTICAL HEAD AND OPTICAL DISC DEVICE

(75) Inventors: Fumitomo Yamasaki, Nara (JP); Akihiro Arai, Kyoto (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 1063 days.

(21) Appl. No.: 12/089,984

(22) PCT Filed: Oct. 10, 2006

(86) PCT No.: PCT/JP2006/320206
§ 371 (c)(1),
(2), (4) Date: Apr. 11, 2008

(87) PCT Pub. No.: WO2007/043522
PCT Pub. Date: Apr. 19, 2007

(65) Prior Publication Data
US 2009/0279399 A1    Nov. 12, 2009

(30) Foreign Application Priority Data

Oct. 12, 2005    (JP) .................................. 2005-297461

(51) Int. Cl.
*G11B 7/00* (2006.01)
(52) U.S. Cl.
USPC .................. 369/44.32; 369/44.14; 369/44.27; 369/44.37; 369/53.14; 369/53.19; 369/112.01
(58) Field of Classification Search
None
See application file for complete search history.

(56) References Cited

U.S. PATENT DOCUMENTS

| | | | |
|---|---|---|---|
| 2002/0036967 A1* | 3/2002 | Osada | 369/53.28 |
| 2002/0048243 A1 | 4/2002 | Yanagisawa et al. | |
| 2003/0090970 A1* | 5/2003 | Watanabe et al. | 369/44.37 |

(Continued)

FOREIGN PATENT DOCUMENTS

| | | |
|---|---|---|
| JP | 2002-056556 | 2/2002 |
| JP | 2003-045058 | 2/2003 |
| JP | 2005-141893 | 6/2005 |
| JP | 2006-099934 | 4/2006 |

OTHER PUBLICATIONS

International Search Report for corresponding Application No. PCT/JP2006/320206 dated Jan. 16, 2007.

*Primary Examiner* — Joseph Haley
*Assistant Examiner* — Ifedayo Iluyomade
(74) *Attorney, Agent, or Firm* — Renner, Otto, Boisselle & Sklar, LLP

(57) ABSTRACT

A tilt can be detected highly accurately by minimizing the tilt detection error. An optical head includes: an objective lens for converging a light beam from a light source onto an optical disc; a photodetector section receiving the beam, reflected from the disc, at divided areas on its photodetection plane and outputting light detection signals from those areas; and a tilt detecting section for detecting a relative tilt between the lens and disc based on the detection signals. The tilt detecting section generates a first push-pull signal PP1 based on the detection signals supplied from a first group of areas, which are arranged symmetrically to a virtual reference line drawn parallel to a disc radial direction and crossing an optical axis, also generates a second push-pull signal PP2 based on the detection signals supplied from a second group of areas, different from the first group and also arranged symmetrically to the reference line, changes coefficients k according to the location of the lens in a disc radial direction, and generates a tilt detection signal TLT by TLT=PP1−k×PP2.

18 Claims, 12 Drawing Sheets

U.S. PATENT DOCUMENTS

| | | | |
|---|---|---|---|
| 2003/0095485 A1* | 5/2003 | Katayama | 369/53.19 |
| 2005/0030487 A1* | 2/2005 | Inoue | 353/69 |
| 2005/0083816 A1* | 4/2005 | Arai | 369/53.19 |
| 2006/0077810 A1* | 4/2006 | Yamasaki et al. | 369/44.41 |
| 2008/0084798 A1* | 4/2008 | Kadowaki et al. | 369/44.37 |
| 2008/0259750 A1* | 10/2008 | Kadowaki et al. | 369/44.41 |

* cited by examiner

INFORMATION TRACK NUMBER

STATUS OF INFORMATION TRACK

INWARD DISPLACEMENT ←OBJECTIVE LENS LOCATION [μm]→OUTWARD DISPLACEMENT

OPTICAL HEAD AND OPTICAL DISC DEVICE

TECHNICAL FIELD

The present invention relates to an optical head for optically reading and/or writing information from/on an information storage medium such as an optical disc, and also relates to an optical disc drive including such an optical head.

BACKGROUND ART

Recently, there are more and more opportunities to store audiovisual data including audio data and video data, which have been broadcast either as airwaves or over a telecommunications network, on optical discs. As the size of the data to be stored has been increasing, there is an increasing demand for optical discs with high storage density and huge storage capacity.

To store data at a higher density on an optical disc, the beam spot of a light beam for use to perform a read/write operation needs to have a decreased size. For that purpose, an objective lens with a large numerical aperture (NA) is used more and more often.

However, the greater the numerical aperture, the closer to the information storage layer of an optical disc the objective lens should be located. In that case, if the optical disc had a significant tilt due to warp, for example, then the influence of coma aberration to be produced in such a situation would be no longer negligible. This is because the coma aberration would interfere with the drive's proper read and write operations.

Some conventional optical heads for optical discs have the ability to detect the relative angle defined by the given optical disc with respect to the optical axis of the objective lens (such an angle will be referred to herein as a "tilt"). If the tilt detected is corrected such that the optical axis crosses the information storage layer of the optical disc at right angles, then the coma aberration will not be produced.

FIG. 15 schematically shows a configuration for a conventional optical head and conventional tilt detecting mechanism that are disclosed in Patent Document No. 1. The conventional optical head shown in FIG. 15 includes a light source 101, a beam splitter 103, an objective lens 104, a detection optical system 106, a photodetector section 107, and a tilt detecting section 108. The tilt detecting section 108 includes a signal computing section 109, an amplifier 110 and a differential amplifier 111.

The light emitted from the light source 101 and having an optical axis 102 is transmitted through the beam splitter 103 and then converged by the objective lens 104 onto the information storage layer of a given optical disc. Next, the light is reflected from the optical disc 105, transmitted through the objective lens 104 and then reflected by the beam splitter 103 toward the detection optical system 106. Thereafter, the light is transmitted through the detection optical system 106 and then incident onto the photodetector section 107.

FIG. 16 schematically illustrates the photodetection areas of the photodetector section 107 and the cross section (i.e., beam spot 112) of the incident light beam. The photodetector section 107 includes photodetection areas 107a through 107f, which are irradiated with the light beam that has been reflected from the optical disc 105 and then has formed the beam spot 112 there.

As shown in FIG. 16, the light beam with the beam spot 112 is detected in the six divided photodetection areas 107a through 107f. Specifically, the two arc portions, which are located on the right- and left-hand sides of the beam spot 112, represent areas in which the zero-order and ±first-order components of the light that has been diffracted by the information track groove of the optical disc 105 superpose one upon the other. Also, the arrow shown in FIG. 16 indicates the directions in which the information track runs on the optical disc 105.

The signals generated in the photodetection areas 107a through 107f are supplied to the signal computing section 109, which generates differential signals P01 and P02 by performing the following calculations on the supplied signals:

$$P01=107a-107b$$

$$P02=(107c+107e)-(107d+107f)$$

where the reference numerals 107a through 107f represent the signals that have been generated in the respective photodetection areas 107a through 107f.

In the tilt detecting section 108, the amplifier 110 multiplies the differential signal P02 by k0. Thereafter, the differential amplifier 111 subtracts the product from the differential signal P01 and outputs the difference as a tilt detection signal TL0. That is to say, the tilt detection signal TL0 is given by:

$$TL0=P01-k0 \times P02$$

The constant k0 is determined so as to correct the offset of the differential signal P01, which is caused by the shift of the optical axis of the objective lens 104 from the optical axis 102 of the optical head, by that of the differential signal P02. Thus, the tilt detection signal TL0 would be a signal that is unlikely to be affected by the shift of the optical axis of the objective lens 104.

If the optical disc 105 has tilted in its radial direction with respect to the optical axis 102 of the optical head (i.e., if a so-called "radial tilt" has been produced), then its influence will come up as a difference in phase between the differential signals P0 and P02. This is because a coma aberration is produced while the laser beam is being transmitted through the transparent substrate of the optical disc 105. The coma aberration mainly deforms the wavefronts of portions of the light beam in which the zero-order and ±first-order components of the light diffracted by the information track superpose one upon the other. As a result of the generation of the coma aberration, the differential signals P01 and P02 are subject to different types of modulation by the information track. Consequently, a phase shift is produced between the differential signals P01 and P02.

The tilt detection signal TL0, which is calculated by subtracting k0×P02 from the differential signal P01, will also cause a phase shift due to the radial tilt. That is why by detecting the level of the tilt detection signal TL0 while the beam spot is tracing the center of the information track, the radial tilt can be detected.

In an optical disc of a so-called "amplitude modulation type" (such as a phase change type) on which an information track where information is stored and another information track where no information is stored have mutually different reflectances, the symmetry of the light intensity distribution at the center of a light beam spot might change significantly due to a variation in the converging state toward the optical disc (which will be referred to herein as "defocusing") on the boundary between the recorded track and the unrecorded track (which will be referred to herein as a "recording boundary"). As a result, an offset is produced in the tilt detection signal, thereby causing a tilt detection error.

To overcome such a problem, an optical head for optical discs, having the ability to reduce the offset in the tilt detection signal at the recording boundary, has been developed. FIG. 17 shows the photodetection areas of the photodetector section 107' of the conventional optical head disclosed in Patent Document No. 2 and a light beam spot of the light beam that has been incident on the photodetection areas. The elements of the optical head disclosed in Patent Document No. 2 are the same as the counterparts of the optical head shown in FIG. 15 except the photodetector section 107'. Thus, the following description will be focused on the photodetector section 107'.

FIG. 17 illustrates the beam spot 112' of the light beam that has been incident on the photodetector section 107' and photodetection areas 117a through 117f that are divided to detect the intensities of the light beam received at the respective areas. The light beam is received at the six divided photodetection areas 117a through 117f to leave the beam spot 112' that covers those areas. Then, the signal computing section 109 (see FIG. 15) figures out two differential signals P01 and P02 by the following equations:

$$P01 = 117a - 117b$$

$$P02 = (117c + 117e) - (117d + 117f)$$

And the signal TL0 is given by:

$$TL0 = P01 - k0 \times P02$$

where k0 is a constant.

In FIG. 17, an opaque portion 113 is arranged at the center of the beam spot 112 where the symmetry of the light intensity distribution changes significantly (i.e., an area where there are only zero-order components of diffracted light). As a result, the influence of the symmetry variation at the recording boundary on the differential signals P01' and P02' can be reduced.

It is known that by optimizing the dimensions and shapes of the respective photodetection areas, not just the offset to be caused by the displacement of the objective lens but also the offset produced at the recording boundary can be corrected with the correction coefficient k0 simultaneously and the detection error can also be reduced as well.

Patent Document No. 1: Japanese Patent Application Laid-Open Publication No. 2003-45058
Patent Document No. 2: Japanese Patent Application Laid-Open Publication No. 2005-141893

DISCLOSURE OF INVENTION

Problems to be Solved by the Invention

In the configuration of the conventional optical head, however, the offsets of the differential signals P01 and P02 to be generated as the objective lens moves behave differently. That is why if the correction coefficient is determined at a fixed value, the offsets cannot be corrected fully. Such a problem arises due to the non-uniformity of the intensity distribution of the far field pattern (FFP) of a semiconductor laser as a light source or due to local deposition of dust or dirt on the optical head's optical system.

FIG. 18 shows how the differential signals P01 and P02 may behave in a situation where the FFP has a non-uniform intensity distribution. The abscissa with the scales of −100 through 100 represents the radial location of the objective lens. In this case, the negative (−) sign indicates an inward displacement (i.e., a move toward the inner edge of the disc) and the positive (+) sign indicates an outward displacement (i.e., a move toward the outer edge of the disc). On the other hand, the ordinate on the left-hand side represents the signal levels of the differential signals P01 and P02, while the ordinate on the right-hand side represents the tilt detection error of the tilt detection signal TL0.

If the FFP has a non-uniform intensity distribution, the differential signal P01 may change substantially linearly according to the location of the objective lens, while the differential signal P02 may have two different gradients in the positive and negative displacement directions of the objective lens corresponding to the outward and inward displacements, respectively. In that case, if the correction coefficient k0 is set equal to 2.0, which is a designed value, then the tilt detection signal TL0 will have a significant offset when the objective lens displaces outward, thus causing a tilt detection error.

FIG. 19 shows how the tilt detection error, represented by the tilt detection signal TL0, varies as the correction coefficients k0 are changed in the order of 2.0, 1.8 and 1.6. In an actual optical head, the correction coefficient k0 is determined so as to minimize the tilt detection error (i.e., offset) of the tilt detection signal TL0 within the movable range (of ±100 μm, for example) of the objective lens by reference to FIG. 19. In the example shown in FIG. 19, the correction coefficient k0 is defined to be 1.8.

Nevertheless, even if the correction coefficient k0 is defined to be 1.8, the degree of reduction in tilt detection error is still not enough. Particularly when the intensity distribution of the FFP is significantly non-uniform, the tilt detection error cannot be reduced sufficiently according to this method. Also, considering that the detection error could be further increased due to defocusing or spherical aberration, the tilt detection error is preferably as small as possible.

Furthermore, in detecting the tilt of an optical head for optical discs of the amplitude modulation type, the correction coefficient k0 is determined so as to correct the offset at the recording boundary as well. That is why if the correction coefficient that has been set by the method described above is different from the designed value, the offset at the recording boundary cannot be reduced sufficiently and the tilt detection error would be further increased.

An object of the present invention is to detect a tilt highly accurately by minimizing the tilt detection error.

Means for Solving the Problems

An optical head according to the present invention includes: a light source; an objective lens for converging a light beam, which has been emitted from the light source, onto an optical disc; a photodetector section, which receives the light beam, reflected from the optical disc, at multiple divided areas on its photodetection plane and which outputs a plurality of light detection signals representing the intensities of the light that has been received at the respective areas; and a tilt detecting section for detecting a relative tilt between the objective lens and the optical disc based on the light detection signals. The tilt detecting section generates a first push-pull signal PP1 based on the light detection signals that have been supplied from a first group of the areas, which are arranged symmetrically with respect to a virtual reference line that is drawn parallel to a radial direction of the optical disc and that crosses an optical axis, also generates a second push-pull signal PP2 based on the light detection signals that have been supplied from a second group of the areas, which is different from the first group and which are also arranged symmetrically with respect to the reference line, changes coefficients k according to the location of the objective lens in a radial direction of the optical disc, and generates a tilt detection signal TLT by the equation: TLT=PP1−k×PP2.

The multiple areas may be defined on the photodetection plane by dividing the photodetection plane in a first direction corresponding to the radial direction of the optical disc and in a second direction corresponding to the track direction.

The tilt detecting section may include a displacement detecting section for detecting the magnitude of displacement of the objective lens in the radial direction of the optical disc with respect to a predetermined reference location and changing the coefficients k according to the magnitude of the displacement detected.

The tilt detecting section may further include a signal computing section for generating the first and second push-pull signals PP1 and PP2. The signal computing section may further generate a third push-pull signal PP3 based on the light detection signals that have been supplied from a third group of the areas, which are different from the first and second groups of the areas and which are also arranged symmetrically with respect to the reference line. And the displacement detecting section may detect the magnitude of the displacement based on the third push-pull signal PP3 generated.

The tilt detecting section may further include a signal computing section for generating the first and second push-pull signals PP1 and PP2. At least one of the first and second groups of the areas may include a third group of the areas, which receive only zero-order components of the light beam that has been reflected from the optical disc and which are arranged symmetrically with respect to the reference line. The signal computing section may further generate a third push-pull signal PP3 based on the light detection signals that have been supplied from the third group of the areas. And the displacement detecting section may detect the magnitude of the displacement based on the third push-pull signal PP3 generated.

The optical head may further include an actuator with a movable portion to drive the objective lens. The displacement detecting section may detect the magnitude of displacement of the objective lens based on that of the movable portion.

The reflectance of the optical disc on a recorded track on which information has been written may be different from that of the optical disc on an unrecorded track on which no information has been written yet. The first and second groups of the areas need not receive some of the zero-order components of the light beam that has been reflected from the optical disc.

At least one pair of areas, which is arranged symmetrically with respect to the reference line and which is included in each of the first and second groups of the areas, may be separate from each other.

To minimize a variation in the offset of the tilt detection signal TLT, the displacement detecting section may change the coefficients k every time the objective lens has displaced a predetermined distance in the radial direction of the optical disc.

The displacement detecting section may change the coefficients k so as to minimize the variation in the tilt detection signal TLT in a situation where the focus position of the light beam has a predetermined amount of error with respect to an information storage layer of the optical disc.

The displacement detecting section may change the coefficients k so as to minimize the variation in the tilt detection signal TLT in a situation where a predetermined magnitude of spherical aberration has been produced in the light beam with respect to an information storage layer of the optical disc.

The displacement detecting section may store multiple coefficients k values that have been defined in advance based on possible magnitudes of displacement, and may select one of those coefficient k values according to the magnitude of the displacement detected.

The displacement detecting section may classify the possible magnitudes of displacement into multiple ranges and store multiple coefficient k values for the respective ranges. And the displacement detecting section may locate the range to which the magnitude of the displacement detected belongs and change the coefficient k values into the value that is associated with the located range.

The displacement detecting section may classify the possible magnitudes of displacement into an outer range and an inner range on the optical disc with respect to a neutral location of the objective lens and may store multiple coefficient k values for the respective ranges.

The displacement detecting section may classify the possible magnitudes of displacement into a first range including a neutral location of the objective lens, a second range that is located inside of the first range on the optical disc, and a third range that is located outside of the first range on the optical disc, and may store multiple coefficient k values for the respective ranges.

The multiple coefficient k values may be defined when the optical head is assembled and calibrated.

The displacement detecting section may set the coefficient k for every optical disc to be irradiated with the light beam.

The optical head may further include a tilt correcting section for correcting an aberration, which is produced due to a relative tilt between the objective lens and the optical disc, in accordance with the tilt detection signal TLT that has been supplied from the tilt detecting section.

The tilt correcting section can tilt the objective lens at least in the radial direction of the optical disc in response to a drive signal, and the drive signal may be generated based on the tilt detection signal TLT.

An optical disc drive according to the present invention includes: an optical head according to any of the preferred embodiments of the present invention described above; a motor for driving and rotating an optical disc; and a control section for controlling the optical head and the motor.

Effects of the Invention

According to the present invention, when the first and second push-pull signals PP1 and PP2 are generated based on signals from photodetection areas that have been divided with respect to a virtual reference line that is parallel to the track direction on the optical disc and that crosses the optical axis to figure out a tilt detection signal by TLT=PP1−k×PP2 (where k is a coefficient), the coefficients k are changed as the objective lens displaces in the radial direction. As a result, even if the semiconductor laser has an FFP with a non-uniform intensity distribution, the tilt can still be detected highly accurately.

In addition, if the first and second groups of areas are arranged so as not to receive the zero-order components of the light that has been reflected from the optical disc, the tilt can also be detected accurately even on the recording boundary of an optical disc of a so-called amplitude modulation type on which a recorded information track and an unrecorded information track have mutually different reflectances.

Figure 1:
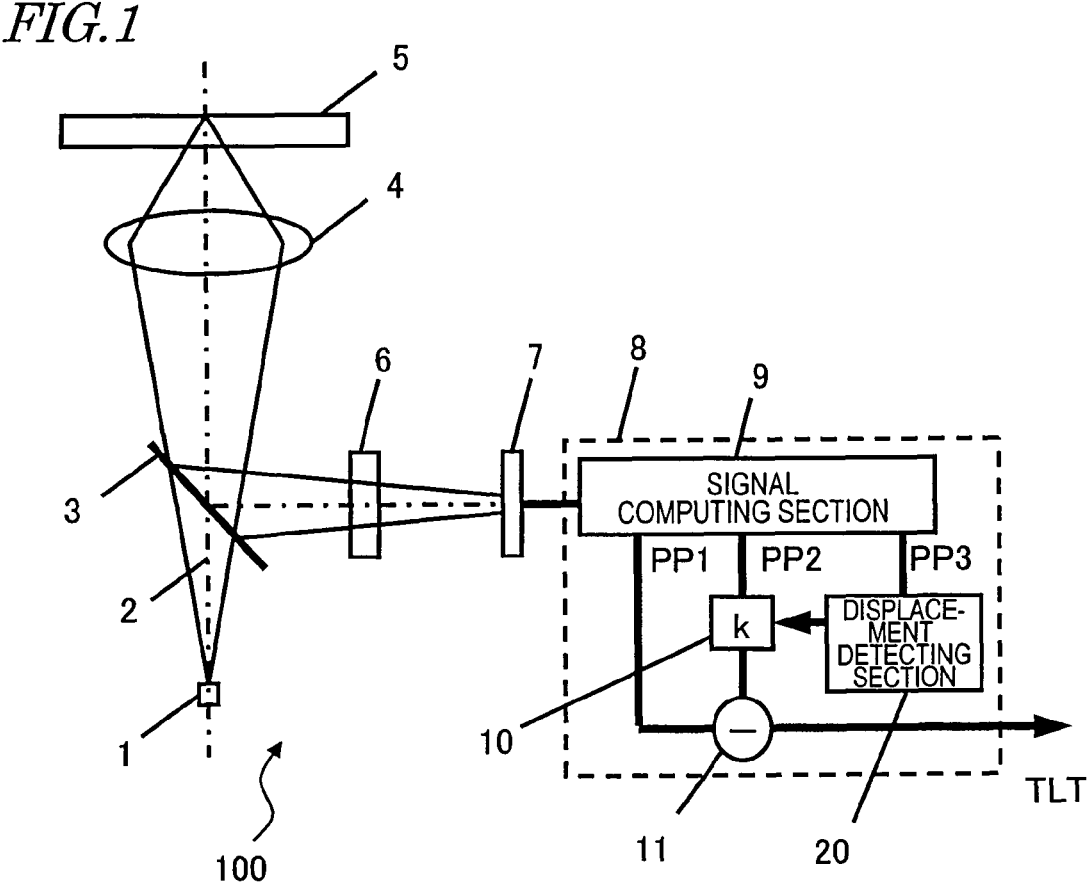
FIG. 1 shows a configuration for an optical head 100 according to a first preferred embodiment of the present invention.

DESCRIPTION OF REFERENCE NUMERALS 1 light source
2 optical axis
3 beam splitter
4 objective lens
5 optical disc
6 detection optical system
7 photodetector section
8 tilt detecting section
9 signal computing section
10 amplifier
11 differential amplifier
20, 21 displacement detecting section
22 sensor
24 movable portion

BEST MODE FOR CARRYING OUT THE INVENTION

Hereinafter, preferred embodiments of an optical head and an optical disc drive according to the present invention will be described with reference to the accompanying drawings. Specifically, first, three different embodiments of an optical head will be described as first through third preferred embodiments of the present invention. And then an optical disc drive that uses an optical head according to any of the first through third preferred embodiments of the present invention will be described as a fourth preferred embodiment of the present invention.

Embodiment 1

First, a first preferred embodiment of an optical head for reducing the offset of a tilt detection signal will be described with reference to FIGS. 1 through 5.

FIG. 1 shows a configuration for an optical head 100 according to a first preferred embodiment of the present invention. The optical head 100 includes a light source 1, a beam splitter 3, an objective lens 4, a detection optical system 6, a photodetector section 7 and a tilt detecting section 8. The tilt detecting section 8 includes a signal computing section 9, an amplifier 10, a differential amplifier 11 and a displacement detecting section 20. PP1, PP2 and PP3 denote the three differential signals (or push-pull signals) generated by the signal computing section 9, while TLT denotes the tilt detection signal generated by the tilt detecting section 8.

In FIG. 1, an optical disc 5 is illustrated for the sake of convenience of description. It should be noted, however, that the optical disc 5 does not form part of the optical head 100. The optical disc 5 may be a DVD or a Blu-ray disc (BD), for example.

The laser beam emitted from the light source 1 and having an optical axis 2 is transmitted through the beam splitter 3 and then converged by the objective lens 4 onto the information storage layer of the optical disc 5 through the transparent substrate thereof. Next, the laser beam is reflected from the optical disc 5, transmitted through the objective lens 4 again, and then reflected by the beam splitter 3 toward the detection optical system 6. Thereafter, the laser beam is led by the detection optical system 6 to the photodetector section 7. The light that has been transmitted through the detection optical system 6 is incident on the photodetector section 7 and received at multiple divided areas of the photodetector section 7.

Figure 2:
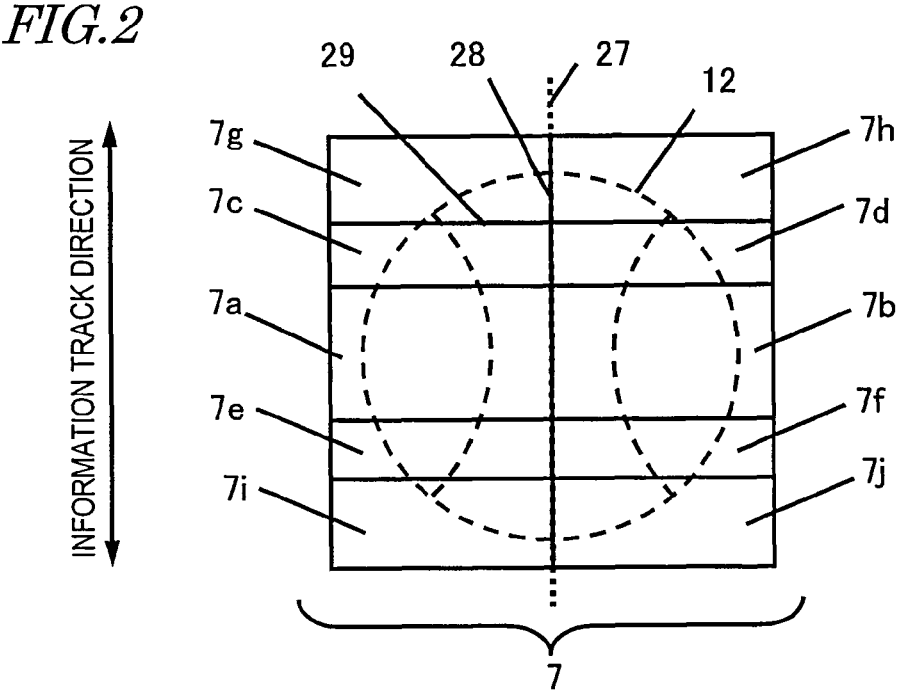
FIG. 2 illustrates the beam spot 12 of a light beam that has been received at multiple divided areas of a photodetector section 7.

FIG. 2 illustrates the beam spot 12 of the light beam that has been received at multiple divided areas of the photodetector section 7. The two arc portions, which are located on the right- and left-hand sides of the beam spot 12, represent areas in which the zero-order and ±first-order components of the light that has been diffracted by the information track groove of the optical disc 5 superpose one upon the other. Also, the arrow shown in FIG. 2 indicates the directions in which the information track runs on the optical disc 5.

The photodetection plane of the photodetector section 7 has been divided not only by a division line 28 that runs parallel to the direction in which the information track runs on the optical disc but also by a number of division lines (e.g., the division line 29) that run parallel to the radial direction of the optical disc. The division line 28 has been defined based on a virtual reference line that crosses the optical axis. In the example shown in FIG. 2, the reference line 27 agrees with the division line 28 on the photodetection plane.

By dividing the photodetection plane in this manner, the photodetection areas 7a through 7j shown in FIG. 2 are defined. A pair of photodetection areas 7a and 7b is arranged symmetrically with respect to the reference line 27. The same can be said about the other pairs of photodetection areas 7c & 7d, 7e & 7f, 7g & 7h and 7i & 7j.

The photodetector section 7 receives the light beam, which has been reflected from the optical disc, at multiple divided photodetection areas 7a through 7j on the photodetection plane in the form of a beam spot 112. Each of these photodetection areas 7a through 7j receives a portion of the incident light beam with the beam spot 112, converts the light received into an output electrical signal representing the intensity of the light received (i.e., a light detection signal) and outputs the signal.

The signal computing section 9 performs a differential arithmetic operation, thereby obtaining three differential signals PP1, PP2 and PP3. The differential signal PP1 is a first push-pull signal generated by splitting a portion of the beam spot 12 (which will be referred to herein as a "first beam spot portion") into two in the radial direction of the optical disc. Using the output electrical signals generated in the respective photodetection areas 7a through 7j, the differential signal PP1 can be calculated by:

$$PP1 = 7a - 7b$$

The differential signal PP2 is a second push-pull signal generated by splitting another portion of the beam spot 12 (which will be referred to herein as a "second beam spot portion") into two in the radial direction of the optical disc. The differential signal PP2 can also be calculated similarly by:

$$PP2 = (7c + 7e) - (7d + 7f)$$

The differential signal PP3 is a third push-pull signal generated by splitting yet another portion of the beam spot 12 (which will be referred to herein as a "third beam spot portion") into two in the radial direction of the optical disc. The differential signal PP3 can also be calculated similarly by:

$$PP3 = (7g + 7i) - (7h + 7j)$$

It should be noted that the optical head normally needs a focus detecting section, a tracking detecting section, an information signal detecting section for detecting an information signal based on the retrieved information and other components. However, these components do not constitute any essential feature of this preferred embodiment and the description thereof will be omitted as for this preferred embodiment. Instead, those components will be described later about the fourth preferred embodiment of the present invention.

Next, the signal TLT generated by the tilt detecting section 8 using the configuration shown in FIGS. 1 and 2 will be described.

If the optical disc 5 has tilted in the radial direction with respect to the optical axis 2 of the optical head (i.e., if a radial tilt has been produced), a coma aberration is produced while the laser beam is being transmitted through the transparent substrate of the optical disc 5.

The coma aberration mainly deforms the wavefronts of portions of the light beam in which the zero-order and ±first-order components of the light diffracted by the information track superpose one upon the other. The wavefronts are deformed to mutually different degrees between the light that has been incident on the photodetection areas to generate the differential signal P01 and the light that has been incident on the photodetection areas to generate the differential signal P02. That is to say, the differential signals PP1 and PP2 are subject to different types of modulation by the information track. Consequently, the radial tilt manifests itself as a phase shift between the differential signals PP1 and PP2.

The tilt detection signal TLT is calculated by the equation:

$$TLT = PP1 - k \times PP2$$

This arithmetic operation can be done by making the differential amplifier 11 subtract the differential signal PP2, multiplied by k by the amplifier 10, from the differential signal PP1.

The tilt detection signal TLT, representing the difference between the differential signals PP1 and PP2, will also cause a phase shift due to the radial tilt. That is why by detecting the level of the tilt detection signal TLT while the beam spot is tracing the center of the information track, the radial tilt can be detected.

The differential signal PP3 is not subjected to any modulation by the information track because the differential signal PP3 has been generated based on only the zero-order components of the diffracted light received. That is why the differential signal PP3 can be said as a signal representing the location of the beam spot 12 that moves on the photodetector section 7 as the objective lens 4 changes its positions.

If the intensity distribution of the FFP is not uniform, it is difficult to determine the correction coefficient k at a fixed value as already described for the background art.

One of the features of the present invention is to reduce the offset of the tilt detection signal TLT by changing the correction coefficients k according to the location of the objective lens in the radial direction of the optical disc. The differential signal PP3 described above is used to determine the location of the objective lens in the radial direction of the optical disc.

Next, a specific procedure of reducing the offset of the tilt detection signal TLT will be described.

Figure 3:
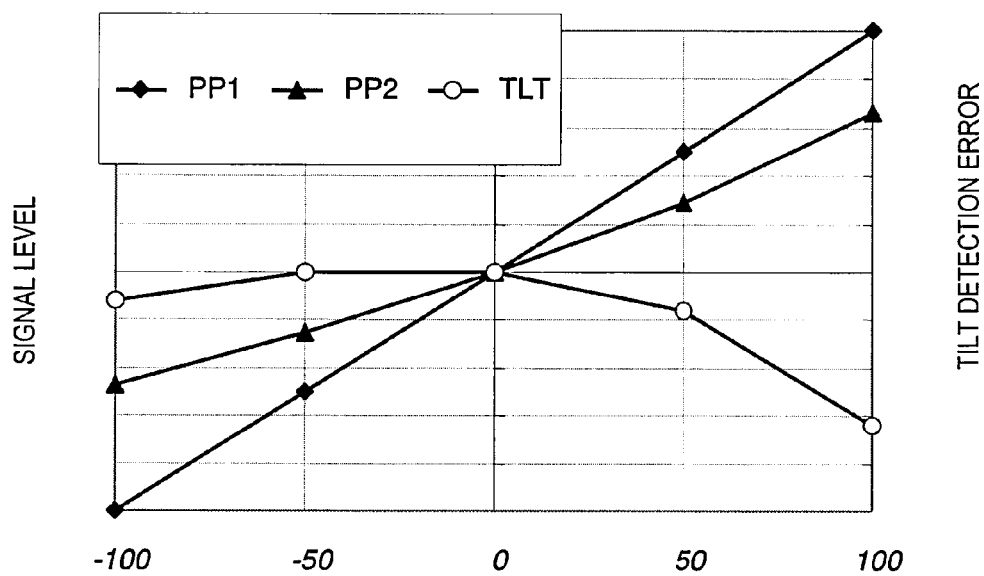
FIG. 3 shows how differential signals PP1 and PP2 and a tilt detection signal TLT behave in a situation where the FFP has a non-uniform intensity distribution.

FIG. 3 shows how the differential signals PP1 and PP2 and the tilt detection signal TLT behave in a situation where the FFP has a non-uniform intensity distribution.

The abscissa with the scales of −100 through 100 represents the radial location of the objective lens. In this case, the negative (−) sign indicates an inward displacement (i.e., a move toward the inner edge of the disc) and the positive (+) sign indicates an outward displacement (i.e., a move toward the outer edge of the disc). On the other hand, the ordinate on the left-hand side represents the signal levels of the differential signals PP1 and PP2, while the ordinate on the right-hand side represents the tilt detection error of the tilt detection signal TLT, which was calculated on the supposition that the correction coefficient k was equal to 2.0 that was a designed value.

The reference location of the objective lens, represented by a scale of zero on the axis of abscissas, is the neutral location of the objective lens when no voltage is applied to the actuator (to be described later) to drive the objective lens. While the objective lens is located at the reference position, the light source 1 and the objective lens 4 have their optical axes aligned with each other. If there is another non-illustrated optical element (such as a collimator lens) between the light source 1 and the objective lens 4, then its optical axis is also aligned with those of the light source 1 and the objective lens 4.

Since the FFP has a non-uniform intensity distribution, the differential signal PP1 changes substantially linearly according to the location of the objective lens but the differential signal PP2 has two different gradients in the positive and negative displacement directions of the objective lens corresponding to the outward and inward displacements, respectively. If the correction coefficient k described above is used, the tilt detection error (offset) of the tilt detection signal TLT is substantially canceled when the objective lens displaces inward but the offset is not canceled when the objective lens displaces outward. This is because the tilt detection signal TLT is calculated with the correction coefficient k fixed.

Figure 4:
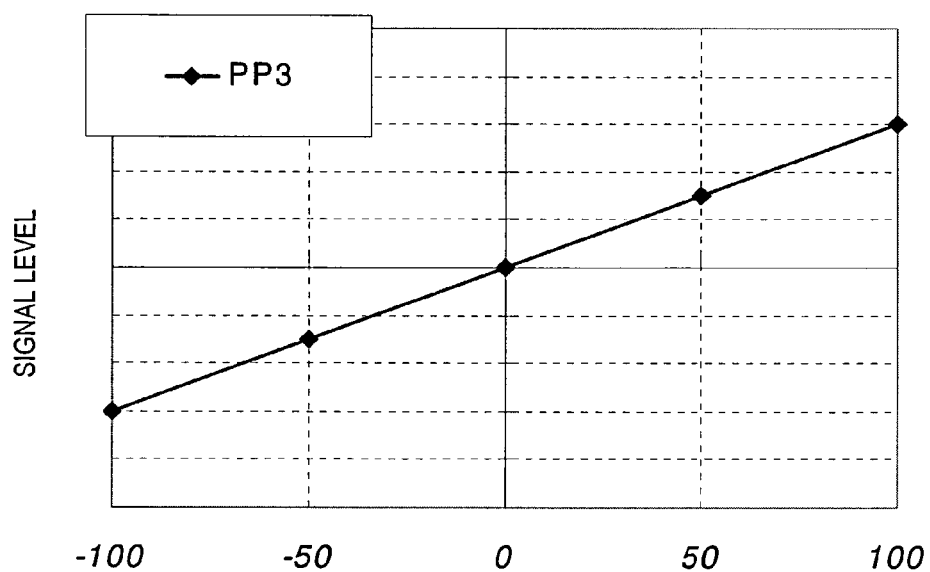
FIG. 4 shows how the signal level of a differential signal PP3 changes according to the location of the objective lens.

Thus, to overcome such a problem, according to this preferred embodiment, the values of the correction coefficient k are changed according to the location of the objective lens, which is detected based on the signal level of the differential signal PP3. FIG. 4 shows how the signal level of the differential signal PP3 changes according to the location of the objective lens. As shown in FIG. 4, the signal level of the differential signal PP3 changes substantially linearly with the location of the objective lens.

The displacement detecting section 20 determines the signal level of the differential signal PP3, thereby detecting the radial location of the objective lens 4. Also, while the objective lens 4 is located within a predetermined range, the displacement detecting section 20 changes the correction coefficients k of the amplifier 10.

Figure 5:
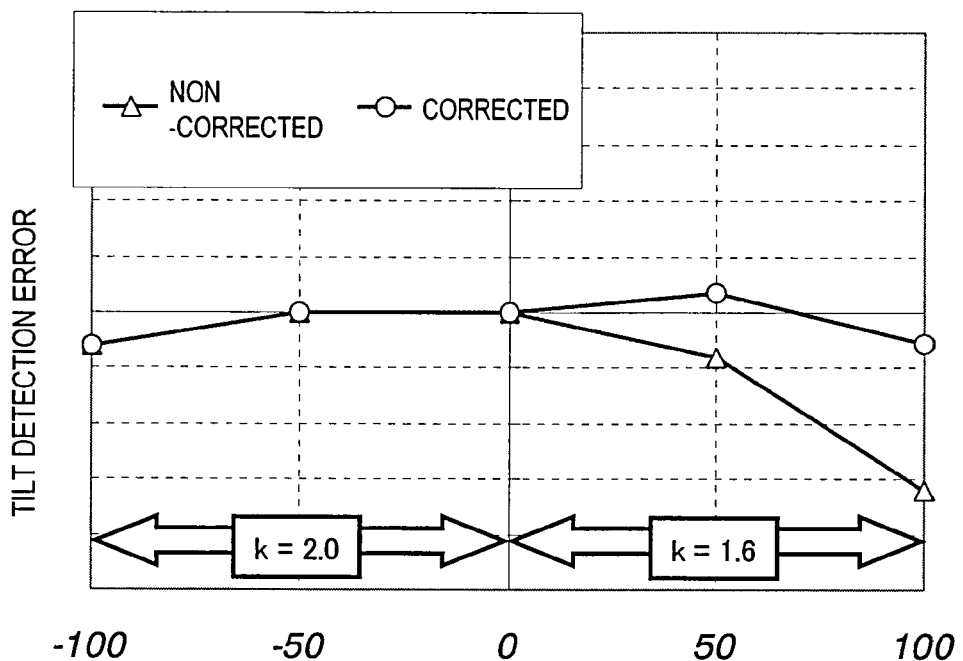
FIG. 5 shows how the tilt detection error changes according to the location of the objective lens in a situation where the values of the correction coefficient k are changed with the location of the objective lens.

To give an example, FIG. 5 shows how the tilt detection error changes according to the location of the objective lens in a situation where the values of the correction coefficient k are changed with the location of the objective lens. As shown in FIG. 5, on sensing, based on the differential signal PP3, that the objective lens 4 is located within the range of −100 μm to 0 μm, the displacement detecting section 20 sets the correction coefficient k of the amplifier 10 equal to 2.0.

On the other hand, on sensing, based on the differential signal PP3, that the objective lens 4 is located within the range of 0 μm to +100 μm, the displacement detecting section 20 changes the correction coefficients k into 1.6 in that range. In FIG. 5, the tilt detection errors in the situation where the values of the correction coefficient k were corrected from 2.0 into 1.6 are plotted by the open circles ○, while the tilt detection errors in a situation where the correction coefficient k remained 2.0 (i.e., was not corrected) are plotted by the open triangles Δ. It can be seen that the tilt detection errors represented by the former graph were more uniform in the overall location range of the objective lens and were reduced to a substantially constant level, irrespective of the location of the objective lens.

That is why by changing the values of the correction coefficient k according to the location of the objective lens, the offset of the tilt detection signal TLT can be canceled and the tilt detection error can be reduced in the entire displacement range of the objective lens 4 (e.g., within the range of ±100 μm in this preferred embodiment).

It should be noted that as the displacement detecting section 20 could always detect the location of the objective lens 4 based on the differential signal PP3, the correction coefficients could be varied finely with the location of the objective lens 4 such that the correction coefficient is always optimized at every location of the objective lens 4. Actually, however, any correction coefficient may be selected as long as the influence of the tilt detection error of the tilt detection signal TLT can be reduced to a negligible level for the system.

The degree of reduction in tilt detection error is closely correlated to the level of expected performance of an optical head being designed. For that reason, if the objective lens 4 has a displacement range of ±100/μm, one of the two correction coefficients may be selected depending on whether the objective lens 4 is located inside or outside as shown in FIG. 5.

Alternatively, the displacement range of the objective lens 4 (i.e., the range in which the objective lens 4 can move) may be divided into three or more sub-ranges and the displacement detecting section 20 may store the values of coefficients k for the respective sub-ranges. In that case, the displacement detecting section 20 may determine the location of the objective lens 4 based on the differential signal PP3 and also determine which sub-range the location belongs to, thereby selecting a coefficient k associated with that sub-range. For example, one of three correction coefficients may be selected depending on whether the objective lens 4 is located within the range of +50 μm to +100 μm, within the range of +50 μm to −50 μm including the neutral position (0 μm) of the objective lens 4, or within the range of −50 μm to −100 μm. Still alternatively, the displacement range of the objective lens 4 may be divided into four to nine sub-ranges and appropriate correction coefficients may be set for the respective sub-ranges.

According to such a method of selectively using one of multiple correction coefficients that have been set in advance for the respective locations of the objective lens, the displacement detecting section 20 and the amplifier 10 can have relatively simple circuit configurations.

Embodiment 2

Hereinafter, a second preferred embodiment of an optical head for reducing the offset of a tilt detection signal will be described with reference to FIGS. 6 through 10. The optical head of this preferred embodiment has the same configuration as the counterpart of the first preferred embodiment described above except the configuration of the photodetector section 7 to be described later. That is why the same components that are used in both of the first and second preferred embodiments will not be described all over again.

A preferred embodiment to be described below is an optical head that operates on an optical disc of a so-called amplitude modulation type (such as a phase change type). In such an optical disc, an information track on which data has been written and an information track on which no data has been written yet have mutually different reflectances, and therefore, the tilt detection signal TLT varies in the boundary between those tracks and the detection errors are also affected by the variation. Thus, to reduce the detection errors of the tilt detection signal TLT on that boundary portion, the following configuration is adopted.

Figure 6:
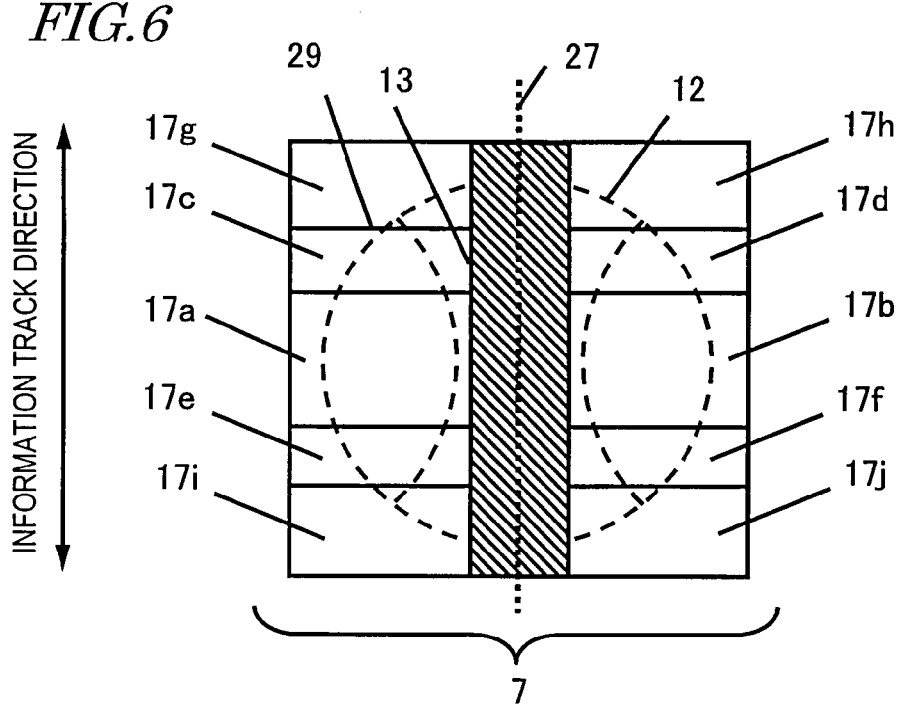
FIG. 6 illustrates a relation between the beam spot 12 and the divided pattern of the photodetector section 7.

FIG. 6 illustrates a relation between the beam spot 12 and the divided pattern of the photodetector section 7.

The photodetector section 7 receives the light beam, which has been reflected from the optical disc, at multiple divided photodetection areas 17a through 17j on the photodetection plane in the form of a beam spot 12 and outputs a plurality of light detection signals representing the intensities of the light that has been received at the respective areas. Each of these photodetection areas 7a through 7j receives a portion of the incident light beam with the beam spot 12, converts the light received into an output electrical signal representing the intensity of the light received and outputs the signal.

The photodetector section 7 has an opaque portion 13, which is arranged in a center area of the photodetection plane where only zero-order components of the diffracted light (or zero-order light) are incident. The opaque portion 13 and the respective photodetection areas 17a through 17j are divided by two division lines that run in the direction in which the information track runs. These two division lines are arranged parallel to each other along a virtual reference line 27 that crosses the optical axis. Unlike the example shown in FIG. 2, however, the reference line 27 and the division line are not aligned with each other. Nevertheless, as in the example shown in FIG. 2, the respective photodetection areas 17a through 17j have been divided by a number of division lines (such as the division line 29) that are parallel to the radial direction of the optical disc.

The signal computing section 9 performs a differential arithmetic operation, thereby obtaining three differential signals PP1, PP2 and PP3.

As in the first preferred embodiment described above, the differential signal PP1 shown in FIG. 1 is a first push-pull signal generated by splitting a first beam spot portion into two in the radial direction of the optical disc. Using the output electrical signals generated in the respective photodetection areas 17a through 17j, the differential signal PP1 can be calculated by:

$$PP1=17a-17b$$

The differential signal PP2 is a second push-pull signal generated by splitting a second beam spot portion into two in the radial direction of the optical disc. The differential signal PP2 can also be calculated similarly by:

$$PP2=(17c+17e)-(17d+17f)$$

The differential signal PP3 is a third push-pull signal generated by splitting a third beam spot portion into two in the radial direction of the optical disc. The differential signal PP3 can also be calculated similarly by:

$$PP3=(17g+17i)-(17h+17j)$$

As already described for the first preferred embodiment, the differential signal PP3 changes substantially linearly according to the location of the objective lens in this preferred embodiment, too. That is why by having the signal level of the differential signal PP3 determined by the displacement detecting section 20, the location of the objective lens 4 can be detected.

The tilt detection signal TLT can also be given by the equation TLT=PP1−k×PP2 as in the first preferred embodiment described above.

In this preferred embodiment, the opaque portion 13 is arranged at the center of the photodetection area to detect the beam spot 12 such that the portion of the beam spot to be affected most by the variation in reflectance at the recording boundary is not detected. As a result, the detection errors at the recording boundary of an optical disc of the so-called amplitude modulation type (such as a phase change type) can be reduced. As used herein, the "portion of the beam spot" refers to a portion of the zero-order light. By optimizing the dimensions and shapes of the respective photodetection areas, not only the offset caused by the displacement of the objective lens but also the offset produced at the recording boundary can be corrected simultaneously with the correction coefficient k and the tilt detection errors can be reduced.

Figure 7:
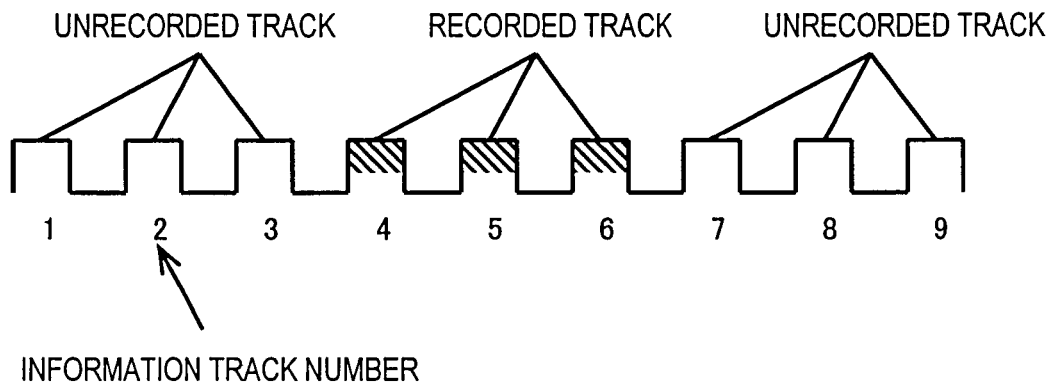
FIG. 7 schematically illustrates a cross section of information tracks on the optical disc 5.

FIG. 7 schematically illustrates a cross section of information tracks on the optical disc 5. The respective information tracks are identified by information track numbers 1 through 9. Among these Information Tracks #1 through #9, Information Tracks #4 through #6 are recorded tracks on which data has been written, while the other Information Tracks #1 through #3 and #7 through #9 are unrecorded tracks. The reflectance of the shadowed recorded tracks #4 through #6 is lower than that of the unrecorded tracks #1 through #3 and #7 through #9.

Figure 8:
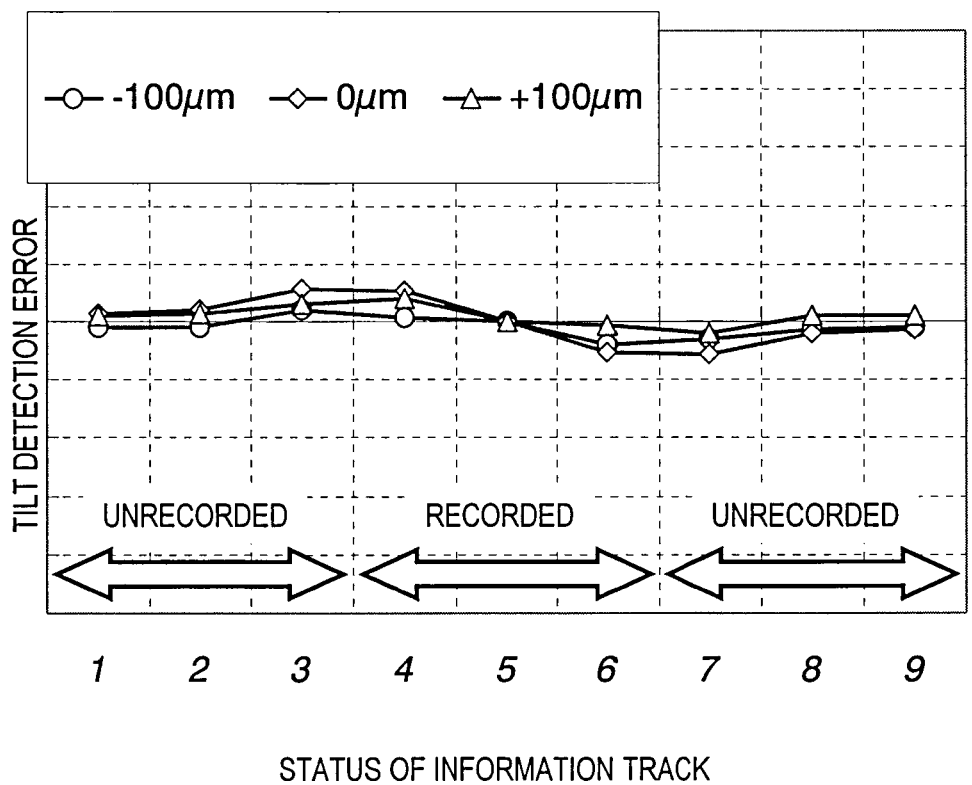
FIG. 8 shows the behavior of the detection error of the tilt detection signal TLT to be caused when a light beam spot traces recorded tracks and unrecorded tracks.

FIG. 8 shows the behavior of the detection error of the tilt detection signal TLT to be caused when a light beam spot traces recorded tracks and unrecorded tracks. The abscissa represents the information track number shown in FIG. 7, where #4 through #6 denote recorded tracks and #1 through #3 and #7 through #9 denote unrecorded tracks. On the other hand, the ordinate represents the tilt detection error of the tilt detection signal TLT. Also, the three curves are associated with three different objective lens locations of −100 μm, 0 μm and +100 μm, respectively (for further details, see the legend of FIG. 8).

The detection error is calculated on the supposition that when the photodetector section 7 shown in FIG. 6 is used, a set of three recorded tracks and a set of three unrecorded tracks alternate one after the other periodically and repeatedly as shown in FIG. 7. The relative tilt angle defined between the optical disc 5 and the objective lens 4 in the radial direction is supposed to be zero degrees.

As shown in FIG. 8, by setting the correction coefficient k (to be equal to 2.0, for example) so as to minimize the variation in the tilt detection signal TLT within the objective lens location range of ±100 μm, the variation in the tilt detection signal TLT can also be reduced at the recording boundary.

Suppose the FFP has a non-uniform intensity distribution as in the first preferred embodiment described above. In that case, if the correction coefficient k is set equal to 2.0 when the objective lens is located in the inner area, the offset of the tilt detection signal TLT is substantially canceled. On the other hand, when the objective lens is located in the outer area, the offset cannot be canceled.

As for an optical disc of the amplitude modulation type, the tilt detection error at the recording boundary becomes minimum only when the correction coefficient k is equal to 2.0, which is a designed value. That is why when the objective lens is located in the inner area as shown in FIG. 3, the offset of the tilt detection signal TLT is almost canceled even at the recording boundary.

In this preferred embodiment, the radial location of the objective lens 4 can also be detected and an appropriate correction coefficient may be selected for the objective lens located in an outer area by using the differential signal PP3 as in the first preferred embodiment described above. According to this preferred embodiment, however, it is not appropriate to determine the correction coefficient k so as to minimize only the tilt detection error caused by the displacement of the objective lens. In other words, the correction coefficient is preferably determined so as to minimize the tilt detection error at the recording boundary when the objective lens is located at predetermined positions (e.g., +50 μm and +100 μm as shown in FIG. 3). Furthermore, the correction coefficient is preferably determined so as to minimize the tilt detection error at the recording boundary when the objective lens is located within the range of 0 μm through +100 μm.

In that case, the displacement range of the objective lens 4 may be divided into three or more sub-ranges and coefficient k values may be stored for the respective sub-ranges as already described for the first preferred embodiment. The details are the same as what has already been described for the first preferred embodiment, and will not be described all over again.

The tilt detection error at the recording boundary increases significantly particularly if defocusing or spherical aberration has been produced. As used herein, the "defocusing" refers to a situation where the focus position of a light beam has deviated from the information storage layer of an optical disc to a predetermined degree or more. On the other hand, the spherical aberration refers to a situation where the focal point of light passing through the inner portion of an objective lens and that of light passing through the outer portion of the same objective lens have at least a predetermined degree of error between them. That is why in a situation where defocusing and/or spherical aberration has been produced, the correction coefficient is preferably determined so as to minimize the tilt detection error.

It should be noted that the photodetection areas 17g through 17j and the opaque portion 13 for generating the differential signal PP3 do not have to have the pattern shown in FIG. 6.

Figure 9:
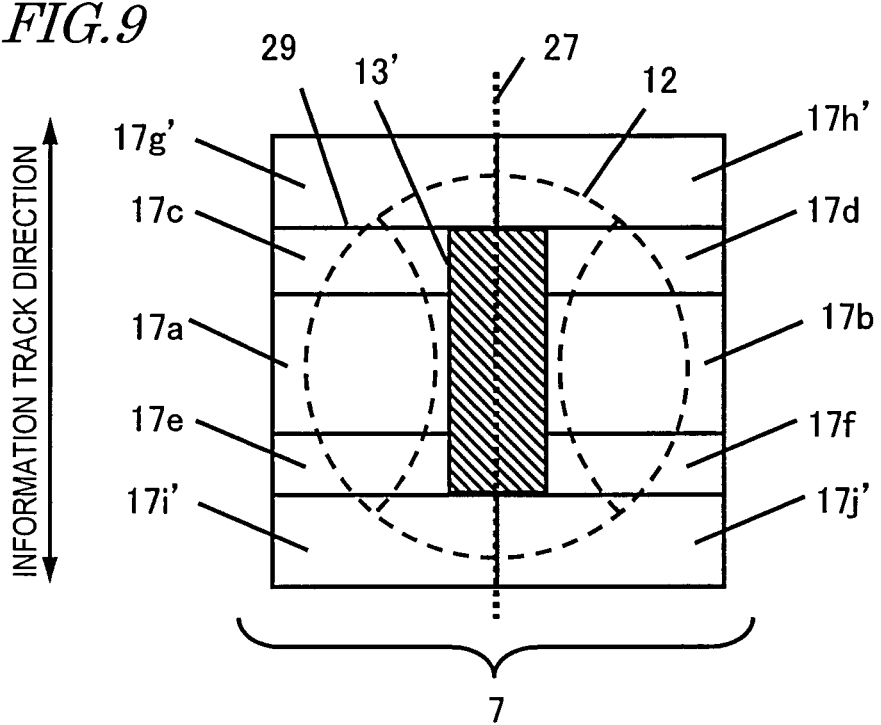
FIG. 9 illustrates another exemplary pattern for the photodetector section 7 that was divided in the direction in which the information track runs.

For example, FIG. 9 illustrates another exemplary pattern for the photodetector section 7 that was divided in the direction in which the information track runs. Specifically, the opaque portion 13' is not provided for photodetection areas 17g', 17h', 17i' and 17j' but is arranged between those areas and along the information track. The opaque portion 13' is also arranged so as not to receive a portion of the zero-order light.

Figure 10:
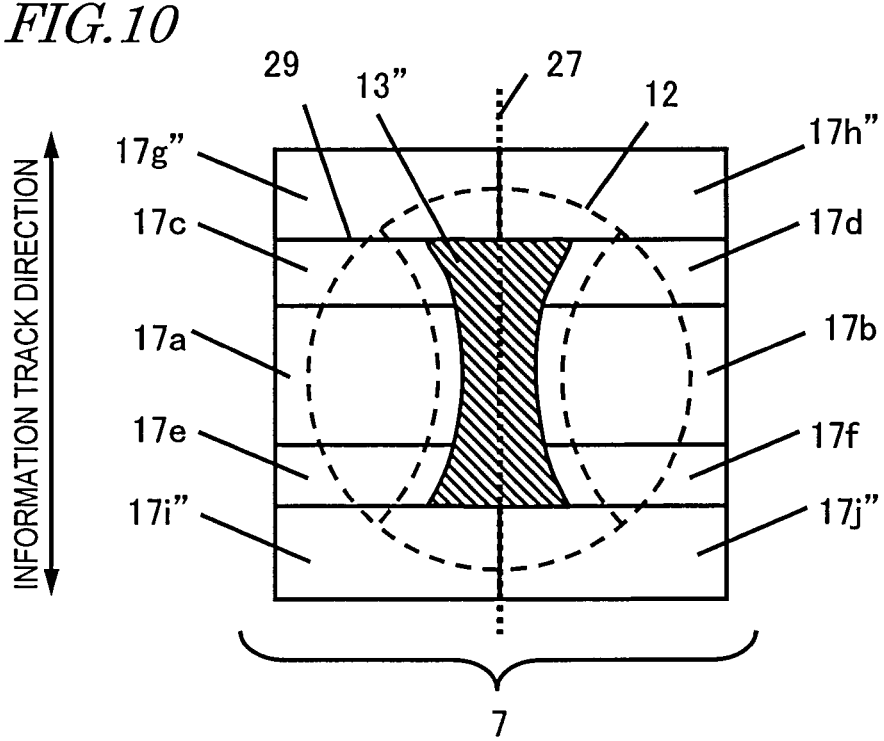
FIG. 10 illustrates still another exemplary pattern for the photodetector section 7 that was divided in the direction in which the information track runs.

FIG. 10 illustrates still another exemplary pattern for the photodetector section 7 that was divided in the direction in which the information track runs. Specifically, the opaque portion 13" is not provided between photodetection areas 17g" and 17h" or between photodetection areas 17i" and 17j" but is arranged between those areas and along the information track. The opaque portion 13" is also arranged so as not to receive a portion of the zero-order light. Furthermore, the opaque portion 13" has a spool-like planar shape, and therefore, there are curved borders between the opaque portion 13" and the respective photodetection areas 17a through 17f.

It should be noted that the reference line 27 and the exemplary division line 29 shown in FIGS. 9 and 10 are defined to divide the photodetection plane into the photodetection areas 17a through 17f and 17g' through 17j' or into the photodetection areas 17a through 17f and 17g" through 17j" as already described with reference to FIGS. 2 and 6.

Also, in the first and second preferred embodiments described above, the beam spot 12 is divided in the information track direction so as to be received at the photodetection areas 7a through 7j or the photodetection areas 17a through 17j (including the photodetection areas 17g' through 17j' or 17g" through 17j"), thereby generating the differential signals PP1 through PP3 as shown in FIGS. 2, 6, 9 and 10. However, the present invention is in no way limited to such division patterns but is broadly applicable for use in any optical head that receives a light beam in a divided pattern and detects the tilt using a plurality of differential signals (or push-pull signals). In the examples shown in FIGS. 2, 6, 9 and 10, the respective division lines running in the radial direction of the optical disc (e.g., the division line 29) are supposed to be straight lines. However, some or all of those division lines may be curved. For example, the respective division lines may be arranged symmetrically with respect to the reference line 27.

Furthermore, the differential signal PP3 for detecting the location of the objective lens 4 is supposed to be generated based on the signals supplied from the photodetection areas 7g through 7j (or 17g through 17j, 17g' through 17j' or 17g" through 17j") that receive only the zero-order light unlike the photodetection areas 7a through 7f (or 17a through 17f) associated with the differential signals PP1 and PP2. However, the same effect can also be achieved even if a push-pull signal PP4 to be calculated as follows is used as an objective lens location detection signal. Specifically, the push-pull signal PP4 may be generated by further dividing the photodetection areas 7a through 7f and using some of those areas that receive only the zero-order light.

Embodiment 3

Hereinafter, a third preferred embodiment of an optical head for reducing the offset of a tilt detection signal will be described with reference to FIG. 11. In the optical head of the third preferred embodiment, any component having substantially the same function as the counterpart of the optical head of the first or second preferred embodiment described above is identified by the same reference numeral and the description thereof will be omitted herein.

Figure 11:
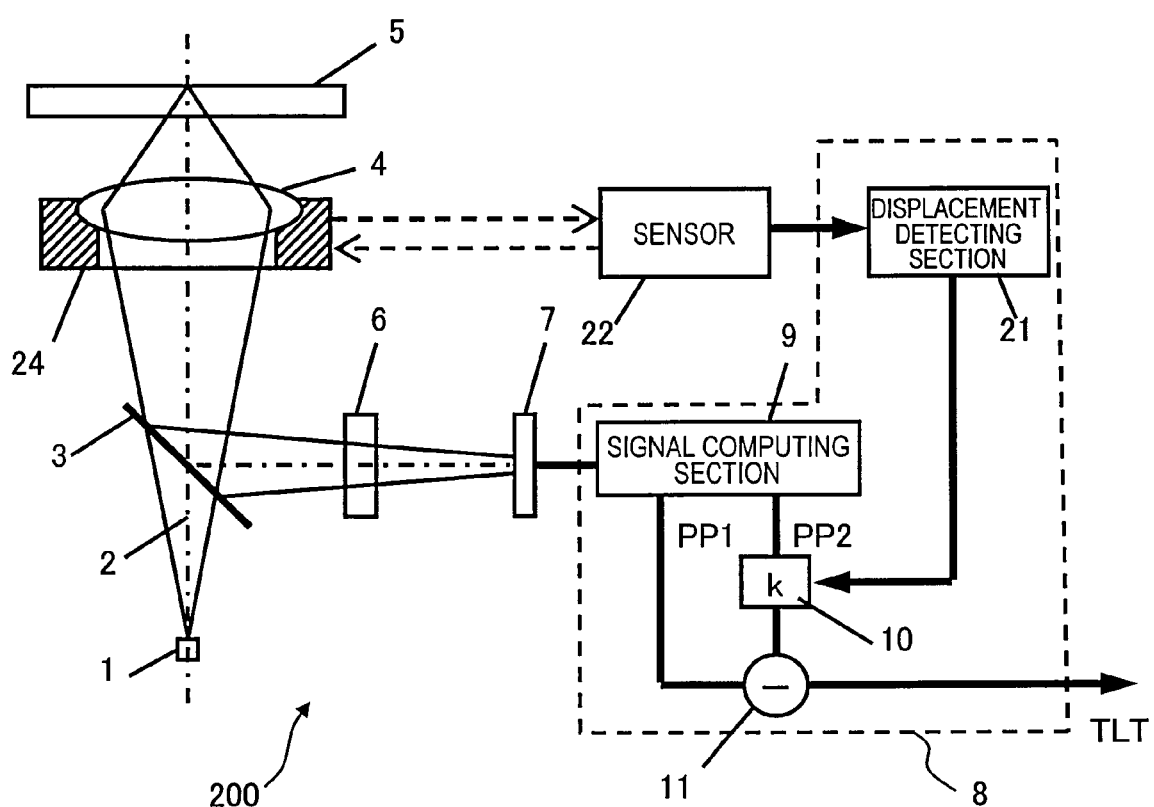
FIG. 11 shows a configuration for an optical head 200 according to a third preferred embodiment of the present invention.

FIG. 11 illustrates a configuration for an optical head 200 according to this preferred embodiment. The optical head 200 includes a displacement detecting section 21, a sensor 22 and a movable portion 24 for an objective lens actuator.

The optical head 200 can determine the location of the objective lens 4 in the radial direction of the optical disc without using the differential signal PP3 that has been described for the first and second preferred embodiments.

The displacement detecting section 21 detects the displacement of the objective lens. Also, based on the output electrical signal supplied from the sensor 22, the displacement detecting section 21 detects the position of the movable portion 24 for the objective lens actuator (more specifically, its location in the radial direction of the optical disc). The movable portion 24 is fixed to the objective lens 4. That is why once the location of the movable portion 24 has been detected, the location of the objective lens 4 in the radial direction of the optical disc can also be determined. As a result, while the objective lens 4 is located within a predetermined range, the displacement detecting section 21 can change the correction coefficients k of the amplifier 10 into an appropriate value as in the first and second preferred embodiments described above.

The objective lens actuator is a unit including the movable portion 24, holds the objective lens 4 in a fixed position and drives the objective lens 4 in response to the voltage applied to the movable portion 24. The objective lens actuator will be described more fully later with reference to FIGS. 12 and 13.

The sensor 22 irradiates the movable portion 24 of the objective lens actuator with light that has been emitted from an LED, for example, and detects the light that has been reflected from the movable portion 24. Then, the sensor 22 outputs an electrical signal (as a drive signal) representing the location of the objective lens actuator movable portion 24 in the radial direction of the optical disc. As a result, the location of the objective lens 4 can be determined in the radial direction of the optical disc even without using the push-pull signal PP3.

For the first through third preferred embodiments, the procedure of detecting the location of the objective lens and determining an appropriate correction coefficient k according to the location of the objective lens has been described. In this case, the correction coefficient k may be determined either while the optical head is being assembled and calibrated or when or before a read/write operation is actually started.

If the correction coefficient k is determined in advance based on the location of the objective lens using an optical disc that complies with a predetermined standard while the optical head is being assembled and calibrated and if the correction coefficients k are switched responsive to an objective lens location detection signal during an actual read/write operation, the circuit configuration can be rather simplified, which is beneficial.

On the other hand, if a correction coefficient k is determined for the given optical disc according to the location of the objective lens before a read/write operation is actually started (e.g., during a boot process) and then used during the read/write operation, then the tilt detection error can be further reduced even when the optical disc has varied groove shapes or reflectances, which is also beneficial.

Embodiment 4

Next, a preferred embodiment of an optical disc drive will be described as a fourth preferred embodiment of the present invention with reference to FIGS. 12 and 13.

Figure 12:
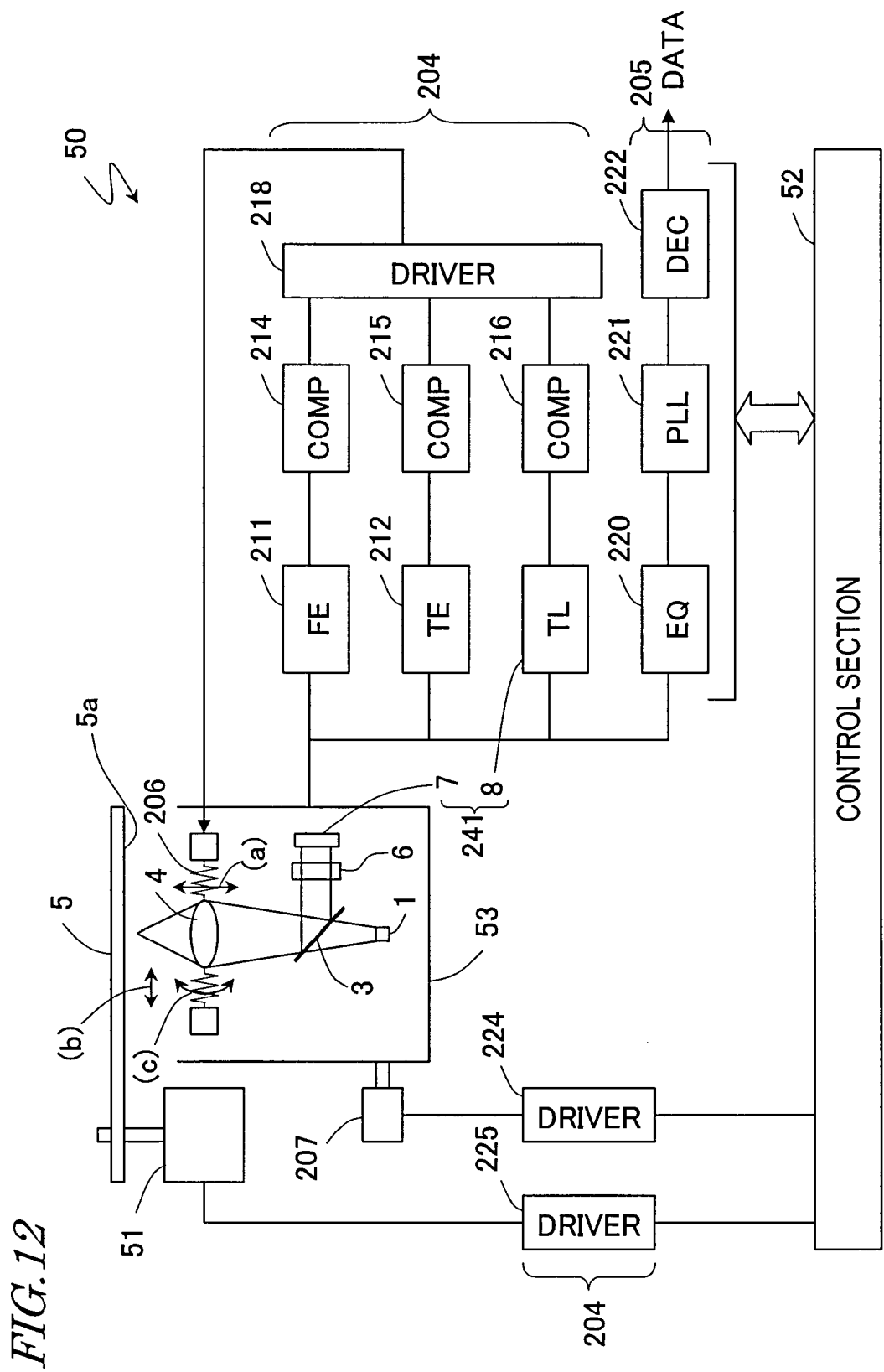
FIG. 12 shows a configuration for an optical disc drive 50 according to a fourth preferred embodiment of the present invention.
Figure 13:
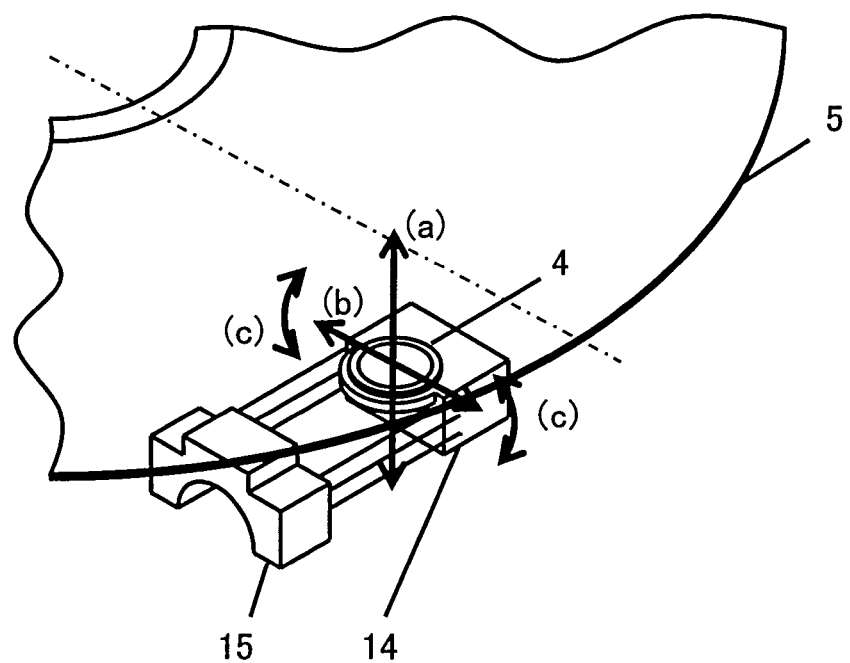
FIG. 13 illustrates the configuration of a movable portion 14 and a fixed portion 15 of an objective lens actuator.

FIG. 12 shows a configuration for an optical disc drive 50 according to this preferred embodiment. All of the components illustrated in FIG. 12 are housed in a housing (not shown). The preferred embodiment to be described below is a read-only optical disc drive. However, the present invention is also applicable for use in a write-only optical disc drive or an optical disc drive that can be used to perform both read and write operations.

The optical disc drive 50 includes an optical disc driving section 51, a control section 52, an optical head 53, a control system 204 and a read signal processing system 205.

The optical disc driving section 51 includes a turntable to mount an optical disc 5 on. The optical disc 5 is supposed to be rotated and driven on the turntable.

The optical head 53 is implemented according to one of the first through third preferred embodiments of the present invention described above. It should be noted that the optical head of the first through third preferred embodiments described above is supposed to include a built-in tilt detecting section. In FIG. 12, however, the tilt detecting section 8 is shown outside of the optical head 53 for the sake of convenience of illustration.

Optionally, the cost could be cut down by reducing the functions of the optical head to required minimum ones. In that case, a tilt control system including the tilt detecting section 8 and other sections that follow it, a focus control system including a focus error signal generating section 211 (to be described later) and other sections that follow it, a tracking control system including a tracking error signal generating section 212 and other sections that follow it, and a reading control system including a waveform equalizing section 220 and other sections that follow it may be all integrated together in a chip circuit that is called an "optical disc controller".

The control section 52 has not only the function of driving and controlling the optical disc driving section 51 and the optical head 53 but also the functions of performing signal processing on a control signal, an information signal and other signals that have been generated by the optical head 53 and providing an interface for the information signal to be exchanged between inside and outside of the housing.

An objective lens actuator 206 is connected to the objective lens 4. The objective lens actuator 206 functions as a focus correcting section and a tracking correcting section for driving the objective lens 4 perpendicularly to the information storage layer 5a (which will be referred to herein as a "focus direction (a)") and parallel to the information storage layer 5a (which will be referred to herein as a "tracking direction (b)"). In addition, the objective lens actuator 206 also functions as a tilt correcting section for driving the objective lens 4 in a tilt direction (c) such that the objective lens 4 has its tilt angles changed in the radial direction of the optical disc 5.

The objective lens actuator 206 includes a movable portion for driving the objective lens 4 and a fixed portion. FIG. 13 illustrates the configuration of the movable portion 14 and fixed portion 15 of the objective lens actuator 206. The movable portion 14 can move the objective lens 4 in three directions that include not only the focus direction (a) and the tracking direction (b) but also the radial tilt direction (c). The fixed portion 15 is fixed to the optical head 53.

As the objective lens actuator 206, a known driving mechanism for driving the objective lens of an optical disc drive may be adopted. For example, a structure for driving or displacing an objective lens by producing electromagnetic force using a coil and magnets may be used.

A traverse driving section 207 is connected to the optical head 53 to move the optical head 53 in its entirety in the radial direction of the optical disc 5.

The control system 204 controls not only the rotation of the optical disc 5 but also the converging state and beam spot position of the light beam to be focused on the information storage layer 5a of the optical disc 5. More specifically, the control system 204 controls the optical disc driving section 51, the traverse driving section 207 and the objective lens actuator 206. For that purpose, the control system 204 includes the photodetector section 7 and the tilt detecting section 8 of an optical head 53 according to one of the first to third preferred embodiments of the present invention described above and the focus error signal generating section 211, the tracking error signal generating section 212, phase compensating sections 214 to 216 and a drive signal generating section 218.

The focus error signal generating section 211 receives a number of signals from the photodetector section 7, thereby generating a focus error signal representing how much the converging state of the light that has been incident on the information storage layer 5a has deviated from a predetermined state. The phase compensating section 214 compensates for the phase of the focus error signal and outputs it, as a focus control signal, to the drive signal generating section 218. On receiving the focus control signal, the drive signal generating section 218 outputs a focus drive signal that will cause the objective lens 4 to move perpendicularly to the information storage layer 5a (such a direction is identified by the reference numeral 231) to the objective lens actuator 206. As a result, the light that has been incident on the information storage layer 5a is controlled so as to maintain a predetermined converging state.

The tracking error signal generating section 212 receives a number of signals from the photodetector section 7, thereby generating a tracking error signal representing how much the light that has been incident on the information storage layer 5a has deviated from the target track. The phase compensating section 215 compensates for the phase of the tracking error signal and outputs it, as a tracking control signal, to the drive signal generating section 218. On receiving the tracking control signal, the drive signal generating section 218 outputs a tracking drive signal that will cause the objective lens 4 to move parallel to the information storage layer 5a (i.e., in the radial direction 232) to the objective lens actuator 206. As a result, the light that has been incident on the information storage layer 5a is controlled so as to always trace the target track.

The photodetector section 7 and the tilt detecting section 8 together form a tilt detector 241, which receives a number of light detection signals from the photodetector section 7 to generate a tilt detection signal TLT. The phase compensating section 216 compensates for the phase of the tilt detection signal TLT and outputs it, as a tilt control signal, to the drive signal generating section 218. On receiving the tilt control signal, the drive signal generating section 218 outputs a tilt drive signal that will cause the objective lens 4 to move in the tilt direction (c) to the objective lens actuator 206. As a result, the light that has been incident on the information storage layer 5a has its optical axis controlled perpendicularly to the information storage layer 5a.

In this preferred embodiment, the objective lens actuator 206 functions as a focus correcting section, a tracking correcting section and a tilt correcting section. Alternatively, the objective lens actuator may function just as a focus correcting section and a tracking correcting section, and a tilt correcting section may be provided separately from the objective lens actuator. For example, a liquid crystal element for correcting the wavefront aberration of passing light by changing refractive indices responsive to the tilt control signal may be arranged between the objective lens 4 and the beam splitter 3.

The focus error signal generating section 211, the tracking error signal generating section 212, the phase compensating sections 214 to 216 and the drive signal generating section 218 have known elements used in a conventional optical disc drive. The focus error signal is generated by a known method such as an astigmatic method. The tracking error signal is generated by a method such as a differential phase detection method, a push-pull method, or a 3-beam method. The photodetector section 7 may have a detection element which is used for generating the focus error signal, tracking error signal and tilt error signal, or may have a plurality of detection elements which are used for generating the respective signals.

The control system 204 further includes a drive signal generating section 224 for driving the traverse driving section 207 and another drive signal generating section 224 for driving the optical disc driving section 51. The drive signal generating section 224 is instructed by the control section 52 so as to either jump the light beam spot to a target track on the information storage layer 5a or to make the light beam spot trace the target track continuously during a read or write operation according to the mode of operation of the optical disc drive 201. On the other hand, the drive signal generating section 224 generates a drive signal to drive the traverse driving section 207 and moves the optical head 53 in accordance with an instruction given by the control section 52. Also, in accordance with an instruction given by the control section 52, the drive signal generating section 204 generates a drive signal to drive the optical disc driving section 51 such that the driving section 51 rotates the optical disc 5 at a predetermined rotational velocity.

The read signal processing system 205 includes a waveform equalizing section 220, a PLL section 221 and a decoder 222 and reads information from the information storage layer 5a of the optical disc 5, thereby generating a read signal. Specifically, the waveform equalizing section 220 receives a signal, including the information that is stored in the information storage layer 5a, from the photodetector section 7, amplifies that signal in a predetermined frequency range and outputs an RF signal. The PLL section 221 receives the RF signal and generates a clock signal that is synchronized with the RF signal. In response to the clock signal, the decoder 222 decodes the RF signal and outputs the information that is stored on the information storage layer 5a.

The optical head 53 is implemented according to one of the first through third preferred embodiments described above, and can detect a radial tilt with little detection error. By tilting the movable portion 24 of the objective lens actuator in the radial tilt direction (c) so as to reduce the radial tilt detected to zero, the relative radial tilt between the objective lens 4 and the optical disc 5 can be reduced. As a result, the coma aberration to be produced due to the tilt can be reduced.

Figure 14:
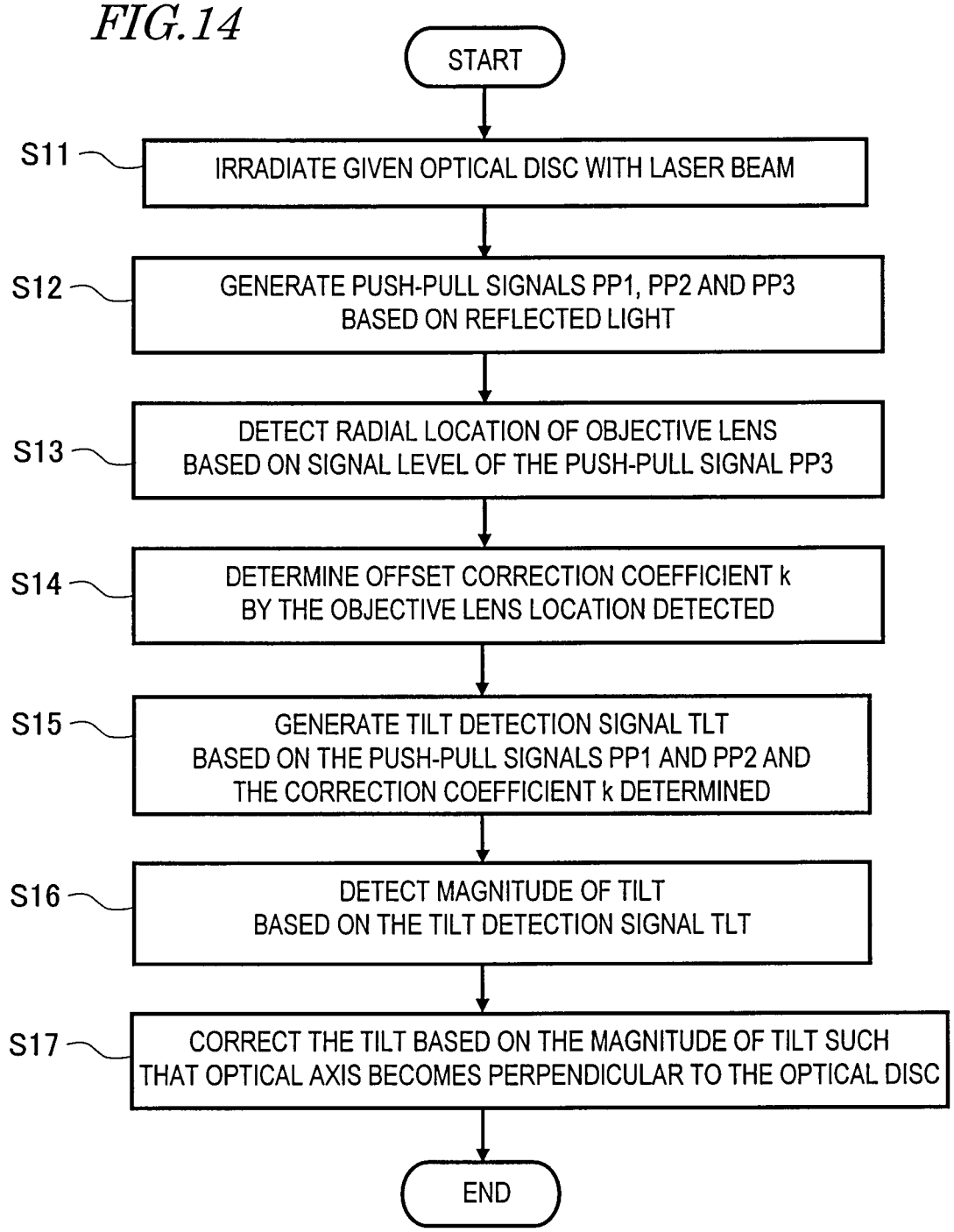
FIG. 14 is a flowchart showing the procedure of a tilt detection process to be performed by the optical disc drive 50.
Figure 15:
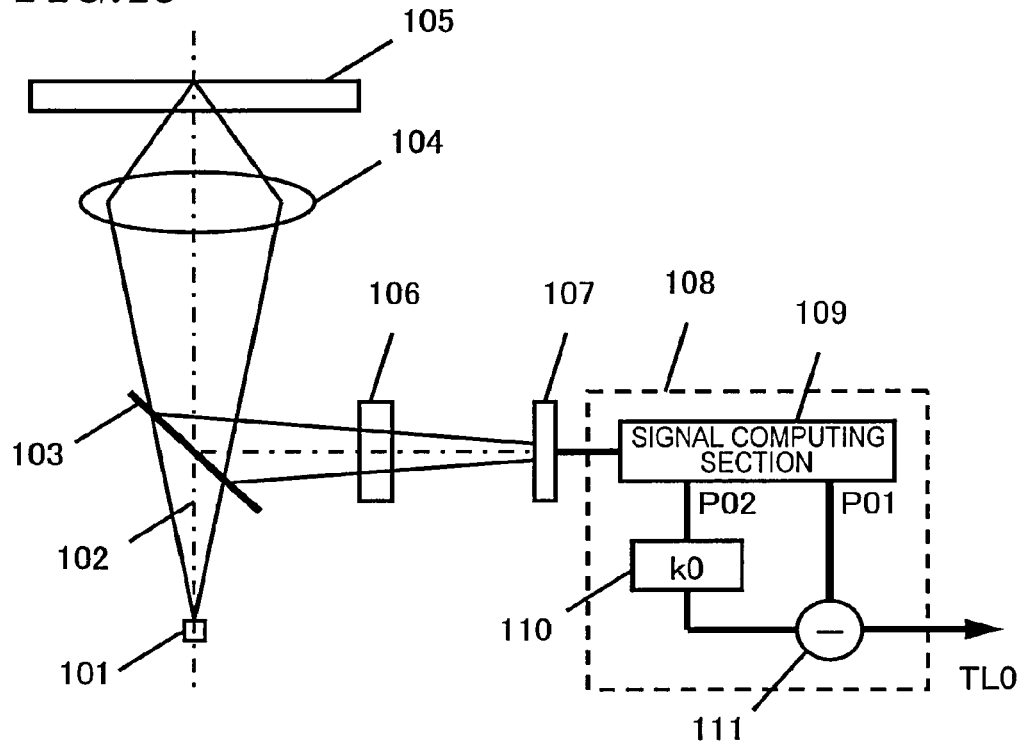
FIG. 15 schematically shows a configuration for a conventional optical head and conventional tilt detecting mechanism that are disclosed in Patent Document No. 1.
Figure 16:
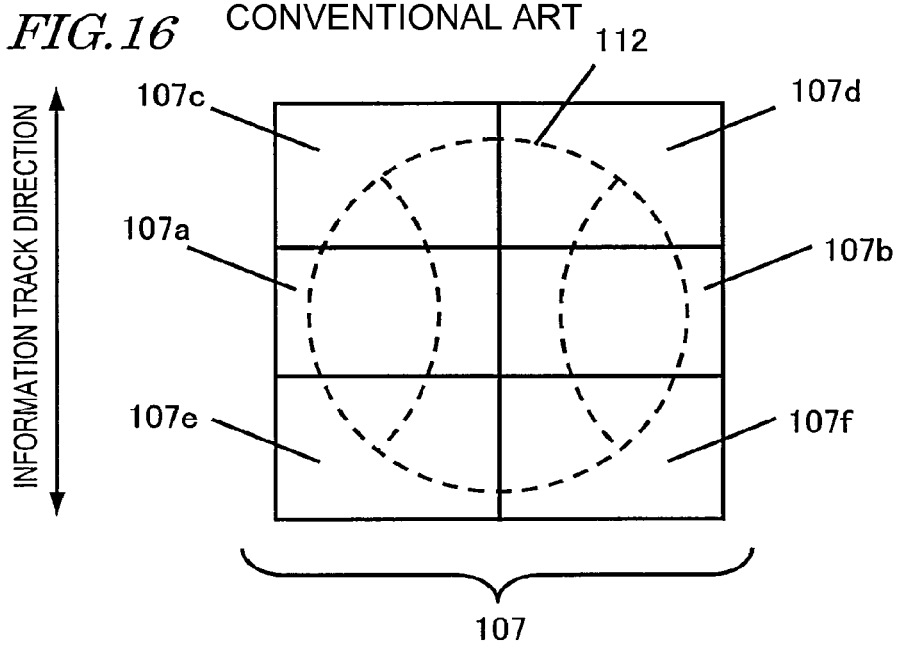
FIG. 16 schematically illustrates the photodetection areas of a photodetector section 107 and the beam spot of the light beam that has been incident on the photodetection areas.
Figure 17:
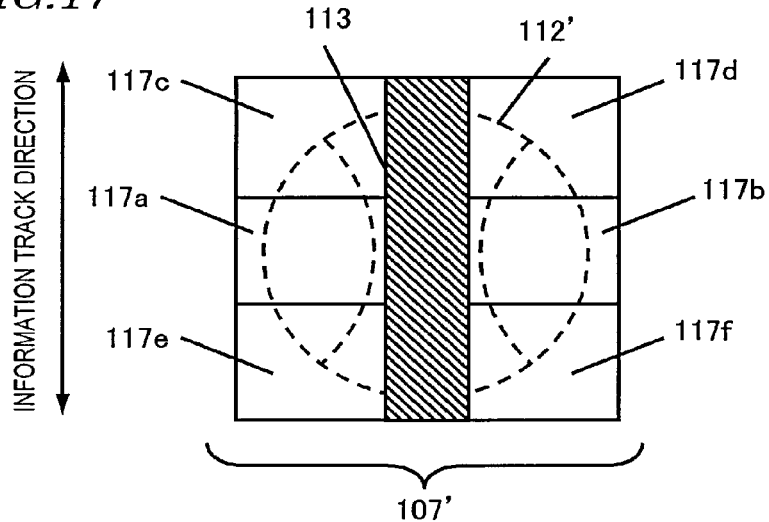
FIG. 17 shows the photodetection areas of the photodetector section 107' of the conventional optical head disclosed in Patent Document No. 2 and a light beam spot of the light beam that has been incident on the photodetection areas.
Figure 18:
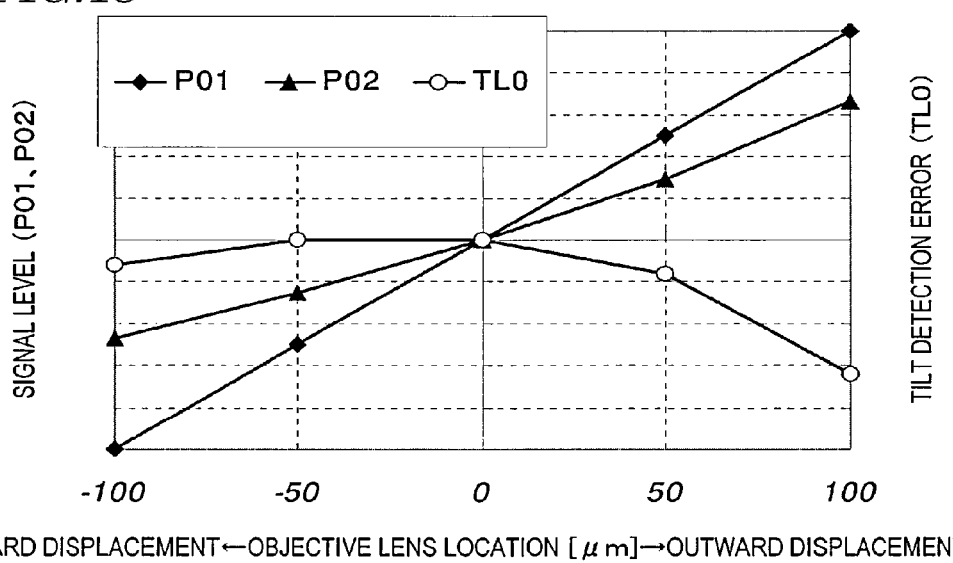
FIG. 18 shows how the differential signals P01 and P02 may behave in a situation where the FFP has a non-uniform intensity distribution.
Figure 19:
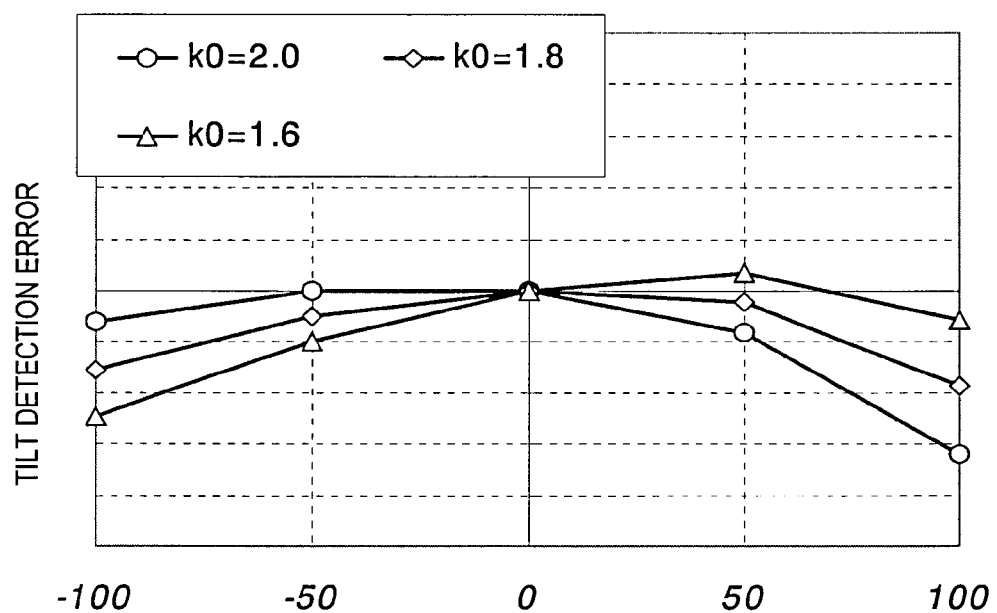
FIG. 19 shows how the tilt detection error, represented by the tilt detection signal TL0, varies as the correction coefficients k0 are changed in the order of 2.0, 1.8 and 1.6.

Hereinafter, the tilt detection process will be described as an exemplary operation performed by the optical disc drive 50. FIG. 14 shows the procedure of the tilt detection process to be performed by the optical disc drive 50.

First, in Step S11, the optical head 53 irradiates the given optical disc 5 with a laser beam. Next, in Step S12, the signal computing section 9 of the tilt detecting section 8 of the optical head 53 generates push-pull signals PP1, PP2 and PP3 based on the light detection signal representing the reflected light.

Subsequently, in Step S13, the displacement detecting section 20 of the tilt detecting section 8 detects the radial location of the objective lens based on the signal level of the push-pull signal PP3. Then, in Step S14, the displacement detecting section 20 determines the offset correction coefficient k by the detected location of the objective lens. As a result, the tilt detecting section 8 generates a tilt detection signal TLT based on the push-pull signals PP1 and PP2 and the correction coefficient k determined.

Thereafter, in Step S16, the phase compensating section 216 of the optical disc drive 50 detects the magnitude of tilt based on the tilt detection signal TLT. More specifically, the phase compensating section 216 compensates for the phase of the tilt detection signal TLT and detects the magnitude of tilt to be corrected. Then, the phase compensating section 216 generates a tilt control signal representing that magnitude of tilt and outputs it to the drive signal generating section 218.

Next, in Step S17, when the drive signal generating section 218 outputs the tilt drive signal representing the magnitude of tilt, the objective lens actuator 206 corrects the tilt of the objective lens 4, in accordance with the tilt drive signal, such that the optical axis of the light beam that has been converged on the information storage layer 5a becomes perpendicular to the information storage layer 5a.

By performing a closed loop control using the tilt detection signal, the radial tilt to be produced due the flutter of the optical disc can be corrected in real time. In addition, the overall size of the optical disc drive can also be reduced effectively.

The objective lens actuator 206 can achieve the same effect not just by tilting the movable portion 4 as in the preferred embodiment described above but also by any other method such as tilting the optical head in its entirety.

In the various preferred embodiments of the present invention described above, the process performed by the displacement detecting section of the optical head to select a correction coefficient k and generate a tilt detection signal based on that correction coefficient k, among other things, may be carried out based on a computer program. An optical head with a tilt detecting section or a computer for an optical disc controller gets such a process done by executing a computer program that is stored in a memory (not shown). The computer program may be circulated on the market by being stored on a storage medium such as a CD-ROM or downloaded over telecommunications lines such as the Internet.

INDUSTRIAL APPLICABILITY

An optical head according to the present invention can detect a radial tilt highly accurately even if the FFP of a laser light source has a non-uniform intensity distribution. In addition, if the photodetector section thereof is designed so as not to receive a portion of the zero-order components of the light beam that has been reflected from an optical disc, the present invention can also be used effectively in an optical head or an optical disc drive for reading and/or writing information from/on an optical disc of an amplitude modulation type, of which recorded and unrecorded tracks have mutually different reflectances.

Among other things, the present invention is applicable particularly effectively to an optical head or an optical disc drive with the function of correcting a coma aberration, produced due to a radial tilt, by tilting its objective lens.

The invention claimed is:

1. An optical head comprising:
a light source;
an objective lens for converging a light beam, which has been emitted from the light source, onto an optical disc;
a photodetector section, which receives the light beam, reflected from the optical disc, at multiple divided areas and which outputs a plurality of light detection signals representing the intensities of the light that has been received at the respective areas; and
a tilt detecting section for detecting a relative tilt between the objective lens and the optical disc based on the light detection signals,
wherein the tilt detecting section generates a first push-pull signal PP1 based on the light detection signals that have been supplied from a first group of the areas, which are arranged symmetrically with respect to a virtual reference line that is drawn parallel to a tracking direction on the optical disc and that crosses an optical axis, also generates a second push-pull signal PP2 based on the light detection signals that have been supplied from a second group of the areas, which is different from the first group and which are also arranged symmetrically with respect to the reference line, changes coefficients k according to the magnitude of displacement of the objective lens from a predetermined reference location in a radial direction of the optical disc, and generates a tilt detection signal TLT by the equation:

$$TLT = PP1 - k \times PP2.$$

2. The optical head of claim 1, wherein the tilt detecting section further includes a signal computing section for generating the first and second push-pull signals PP1 and PP2, and
wherein the signal computing section further generates a third push-pull signal PP3 based on the light detection signals that have been supplied from a third group of the areas, which are different from the first and second groups of the areas and which are also arranged symmetrically with respect to the reference line, and
wherein the tilt detecting section detects the magnitude of the displacement based on the third push-pull signal PP3 generated.

3. The optical head of claim 1, wherein the tilt detecting section further includes a signal computing section for generating the first and second push-pull signals PP1 and PP2, and
wherein at least one of the first and second groups of the areas includes a third group of the areas, which receive only zero-order components of the light beam that has been reflected from the optical disc and which are arranged symmetrically with respect to the reference line, and
wherein the signal computing section further generates a third push-pull signal PP3 based on the light detection signals that have been supplied from the third group of the areas, and
wherein the tilt detecting section detects the magnitude of the displacement based on the third push-pull signal PP3 generated.

4. The optical head of claim 1, further comprising an actuator with a movable portion to drive the objective lens,
wherein the tilt detecting section detects the magnitude of displacement of the objective lens based on that of the movable portion.

5. The optical head of claim 1, wherein the reflectance of the optical disc on a recorded track on which information has been written is different from that of the optical disc on an unrecorded track on which no information has been written yet, and
wherein the first and second groups of the areas do not receive some of the zero-order components of the light beam that has been reflected from the optical disc.

6. The optical head of claim 5, wherein at least one pair of areas, which is arranged symmetrically with respect to the reference line and which is included in each of the first and second groups of the areas, are separate from each other.

7. The optical head of claim 1, wherein to minimize a variation in the offset of the tilt detection signal TLT, the tilt detecting section changes the coefficients k every time the objective lens has displaced a predetermined distance in the radial direction of the optical disc.

8. The optical head of claim 7, wherein the tilt detecting section changes the coefficients k so as to minimize the variation in the tilt detection signal TLT in a situation where the focus position of the light beam has a predetermined amount of error with respect to an information storage layer of the optical disc.

9. The optical head of claim 7, wherein the tilt detecting section changes the coefficients k so as to minimize the variation in the tilt detection signal TLT in a situation where a predetermined magnitude of spherical aberration has been produced in the light beam with respect to an information storage layer of the optical disc.

10. The optical head of claim 1, wherein the tilt detecting section stores multiple coefficients k values that have been defined in advance based on possible magnitudes of displacement, and
selects one of those coefficient k values according to the magnitude of the displacement detected.

11. The optical head of claim 10, wherein the tilt detecting section classifies the possible magnitudes of displacement into multiple ranges, stores multiple coefficient k values for the respective ranges, and locates the range to which the magnitude of the displacement detected belongs and changes the coefficient k values into the value that is associated with the located range.

12. The optical head of claim 11, wherein the tilt detecting section classifies the possible magnitudes of displacement into an outer range and an inner range on the optical disc with respect to a neutral location of the objective lens and stores multiple coefficient k values for the respective ranges.

13. The optical head of claim 11, wherein the tilt detecting section classifies the possible magnitudes of displacement into a first range including a neutral location of the objective lens, a second range that is located inside of the first range on the optical disc, and a third range that is located outside of the first range on the optical disc, and stores multiple coefficient k values for the respective ranges.

14. The optical head of claim 10, wherein the multiple coefficient k values are defined when the optical head is assembled and calibrated.

15. The optical head of claim 10, wherein the tilt detecting section sets the coefficient k for every optical disc to be irradiated with the light beam.

16. The optical head of claim 1, further comprising a tilt correcting section for correcting an aberration, which is produced due to a relative tilt between the objective lens and the optical disc, in accordance with the tilt detection signal TLT that has been supplied from the tilt detecting section.

17. The optical head of claim 16, wherein the tilt correcting section is able to tilt the objective lens at least in the radial direction of the optical disc in response to a drive signal, and wherein the drive signal is generated based on the tilt detection signal TLT.

18. An optical disc drive comprising:
an optical head;
a motor for driving and rotating an optical disc; and
a control section for controlling the optical head and the motor,
wherein the optical head includes:
a light source;
an objective lens for converging a light beam, which has been emitted from the light source, onto the optical disc;
a photodetector section, which receives the light beam, reflected from the optical disc, at multiple divided areas and which outputs a plurality of light detection signals representing the intensities of the light that has been received at the respective areas; and
a tilt detecting section for detecting a relative tilt between the objective lens and the optical disc based on the light detection signals,
wherein the tilt detecting section generates a first push-pull signal PP1 based on the light detection signals that have been supplied from a first group of the areas, which are arranged symmetrically with respect to a virtual reference line that is drawn parallel to a tracking direction on the optical disc and that crosses an optical axis, also generates a second push-pull signal PP2 based on the light detection signals that have been supplied from a second group of the areas, which is different from the first group and which are also arranged symmetrically with respect to the reference line, changes coefficients k according to the magnitude of displacement of the objective lens from a predetermined reference position in a radial direction of the optical disc, and generates a tilt detection signal TLT by the equation:

$$TLT = PP1 - k \times PP2.$$

* * * * *